US007236431B2

(12) United States Patent
Morimoto et al.

(10) Patent No.: US 7,236,431 B2
(45) Date of Patent: Jun. 26, 2007

(54) SEMICONDUCTOR INTEGRATED CIRCUIT FOR AUDIO SYSTEM

(75) Inventors: Yoshihide Morimoto, Osaka (JP); Norio Harada, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 700 days.

(21) Appl. No.: 10/683,209

(22) Filed: Oct. 9, 2003

(65) Prior Publication Data

US 2005/0078562 A1 Apr. 14, 2005

(51) Int. Cl.
*H04B 1/20* (2006.01)

(52) U.S. Cl. .............................................. 369/6; 369/2

(58) Field of Classification Search ..................... None
See application file for complete search history.

(56) References Cited

U.S. PATENT DOCUMENTS 5,633,837 A * 5/1997 Gantt ............................ 369/7
6,674,692 B1 * 1/2004 Holland ......................... 367/7

FOREIGN PATENT DOCUMENTS

JP 2002-229539 8/2002
JP 2002-313072 10/2002

* cited by examiner

*Primary Examiner*—Tan Dinh
(74) *Attorney, Agent, or Firm*—SoCal IP Law Group LLP; Steven C. Serebolf; John E. Gunther

(57) ABSTRACT

A semiconductor integrated circuit for an audio system includes a playback processing section for playing back at least an optical disk, a frequency measurement circuit for measuring a frequency of a radio signal from a tuner, a display control circuit for making a display device display at least the frequency of the radio signal, and a controller for controlling the playback processing section, the frequency measurement circuit, and the display control circuit, according to an external signal. The playback processing section, the frequency measurement circuit, the display control circuit, and the controller are formed on a single semiconductor chip.

10 Claims, 5 Drawing Sheets

SEMICONDUCTOR INTEGRATED CIRCUIT FOR AUDIO SYSTEM

BACKGROUND OF THE INVENTION

1. Field of the Invention

The present invention relates to a semiconductor integrated circuit for an audio system.

2. Description of the Related Art

Audio systems that are presently in common use have a function of playing back audio signals from recording media such as CDs (compact disks), MDs (MiniDisks), and cassette tapes, and also a function as a radio for outputting audio signals based on received radio signals broadcast according to AM, FM and the like.

Such a multi-functional audio system has ICs (integrated circuits) for integrating and controlling the overall functions in response to user inputs, such as to switch between the function for playing back recording media and the function as a radio. In order to display various kinds of information, the audio system of the type described above also has a display device structured of, for example, an LCD and LEDs. Types of information displayed on the display device may be, for example, information about power ON/OFF, information about the band type such as AM/FM and received frequency when functioning as a radio, or information about the operating state of a disk, the track number, and playback mode when functioning in the recording media playback mode.

SUMMARY OF THE INVENTION

One aspect of the present invention is a semiconductor integrated circuit for an audio system comprising:

a playback processing section for playing back at least an optical disk;

a frequency measurement circuit for measuring a frequency of a radio signal from a tuner;

a display control circuit for making a display device display at least the frequency of the radio signal; and a controller for controlling at least the playback processing section, the frequency measurement circuit, and the display control circuit, according to an external signal, wherein the playback processing section, the frequency measurement circuit, the display control circuit, and the controller are formed on a single semiconductor chip.

According to this aspect of the present invention, the playback processing section, the frequency measurement circuit, the display control circuit, and the controller are formed on a single semiconductor chip. Therefore, compared to a case where each of these structural components are formed on separate chips from the controller, it becomes possible to decrease delay that occurs due to signal transmission between a plurality of chips, and thus high speed processing is made possible. Further, since the components are configured into a single chip in which wiring between a plurality of chips is unnecessary, it becomes possible to greatly simplify manufacturing processes as well as achieve downsizing and reduction in cost.

Another aspect of the present invention is a semiconductor integrated circuit for an audio system comprising:

a playback processing section for playing back at least an optical disk;

a frequency measurement circuit for measuring a frequency of a radio signal from a tuner;

a display control circuit for making a display device display at least the frequency of the radio signal; and a controller for controlling at least the playback processing section, the frequency measurement circuit, and the display control circuit, according to an external signal, wherein:

the playback processing section, the frequency measurement circuit, the display control circuit, and the controller are formed on a single semiconductor chip;

the semiconductor chip has a clock generator circuit for generating

- a first clock for making at least the playback processing section, in the semiconductor chip, operate, and
- a second clock for making at least either one of the frequency measurement circuit or the display control circuit operate; and the second clock has a frequency smaller than a frequency of the first clock.

According to this aspect of the present invention, the second clock, which is for making either one of the frequency measurement circuit or the display control circuit operate, has a frequency smaller than a frequency of the first clock, which is for making the playback processing section operate. Therefore, when, for example, the playback processing section for the optical disk is not operated but either one of the frequency measurement circuit or the display control circuit is made to operate, only the second clock having a low frequency will be necessary, and thus it is possible to achieve reduction in power consumption, compared to a case where the playback processing section for the optical disk is made to operate. Further, since it is possible to supply both the first clock and the second clock having a low frequency, it becomes possible to make only the functions other than the playback processing section for the optical disk operate at low power consumption.

Another aspect of the present invention is a semiconductor integrated circuit for an audio system wherein the second clock is different from the frequency of the radio signal.

By preventing the frequency of the second clock from overlapping with the FM and AM frequency bands along with integration of the various circuits/sections into one chip, it becomes possible to prevent radiation.

Another aspect of the present invention is a semiconductor integrated circuit for an audio system wherein the frequency measurement circuit takes an operation clock of said controller as a clock source.

Features and objects of the present invention other than the above will become clear by reading the description of the present specification with reference to the accompanying drawings.

BRIEF DESCRIPTION OF THE DRAWINGS

For more complete understanding of the present invention and the advantages thereof, reference is now made to the following description taken in conjunction with the accompanying drawings wherein.

DETAILED DESCRIPTION OF PREFERRED EMBODIMENTS

At least the following matters will be made clear by the explanation in the present specification and the description of the accompanying drawings.

Figure 1:
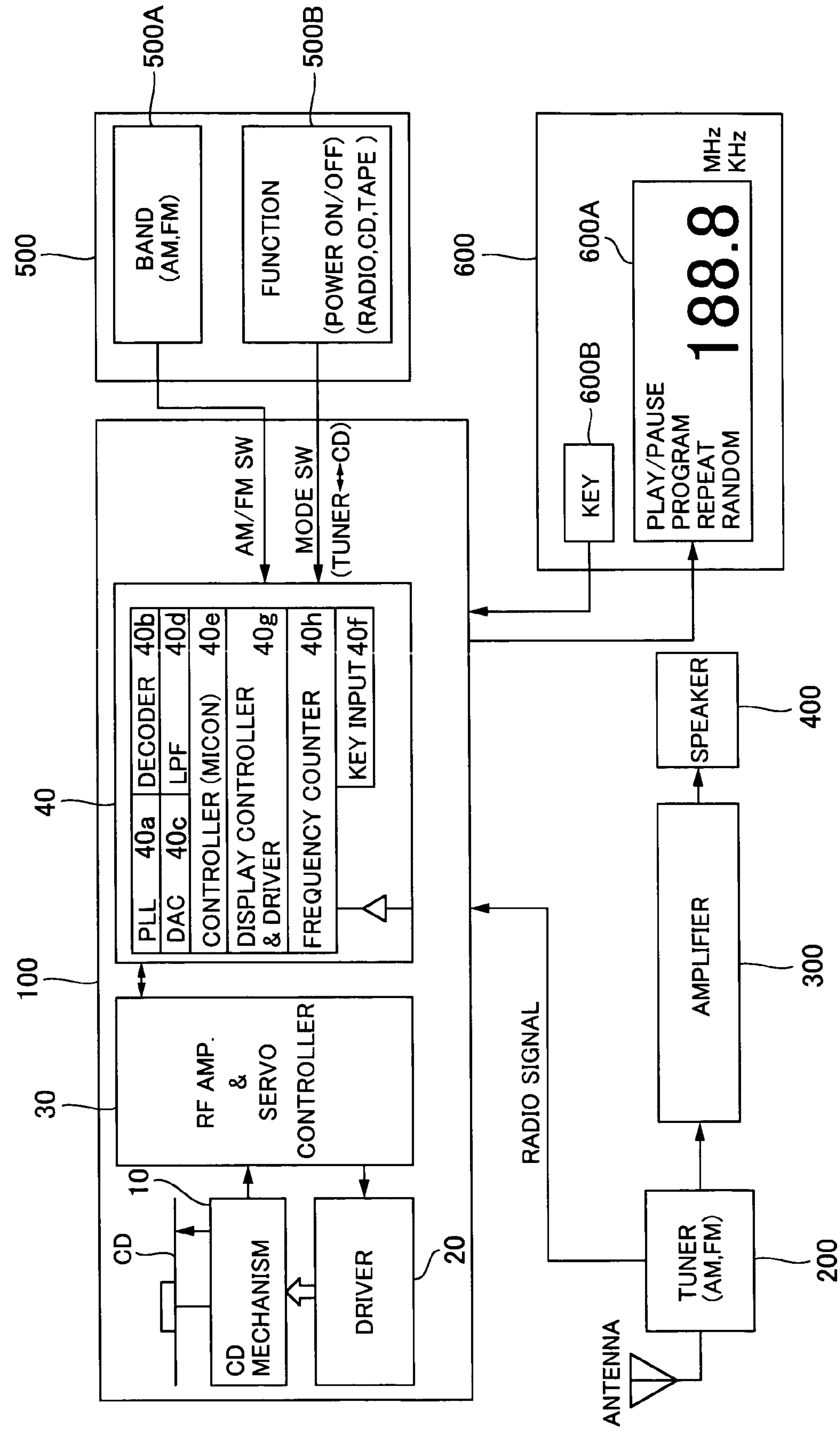
FIG. 1 is a block diagram of an audio system into which a semiconductor integrated circuit of the present embodiment is incorporated.

FIG. 1 is a block diagram of an audio system in which a semiconductor integrated circuit according to the present embodiment is incorporated. The audio system has a CD player device 100, a tuner 200, an amplifier 300, a speaker 400, an input operation section 500, and a display device 600.

The CD player device 100 has a CD drive mechanism 10, a driver 20, an RF amplifier and servo controller 30, and a playback-function-equipped system controller (semiconductor integrated circuit for an audio system; semiconductor chip) 40. The CD drive mechanism 10 has, for example, a spindle motor for making an optical disk rotate, and an optical pickup. The driver 20 generates focus servo signals, tracking servo signals, feed-control signals for the pickup motor, and spindle servo signals and sends them to the CD drive mechanism 10 in order to drive the spindle motor and/or the optical pickup. The RF amplifier and servo controller 30 amplifies RF signals obtained from the optical pickup of the CD drive mechanism 10 and sends the amplified RF signals to the playback-function-equipped system controller 40. The system controller 40 will be described in detail later.

The tuner 200 converts the frequency of radio signals received with an antenna into intermediate frequency signals, demodulates the intermediate frequency signals by AM demodulation or FM demodulation to obtain audio signals, and outputs the audio signals to the amplifier 300 and also outputs the radio signals to the playback-function-equipped system controller 40. The audio signals amplified by the amplifier 300 are output to the speaker 400. The input operation section 500 has an interface, such as switches and buttons, for accepting user inputs, and, for example, has a band selecting section 500A for the radio function and a function selecting section 500B. The band selecting section 500A accepts operations of selecting bands for either AM or FM and outputs, to the system controller 40, a command signal (external signal) "AM/FM SW" for instructing either AM or FM. The function selecting section 500B outputs, to the system controller 40 in response to user input operations, a signal (external signal) "MODE SW" for switching between the recording media playback function and the radio function as well as between power ON and OFF.

The display device 600 is configured of, for example, an LCD and LEDs for displaying various kinds of information. According to signals output from the system controller 40, the display device 600 displays various kinds of information on the display screen 600A. Various kinds of information displayed on the display device may be, for example: the power ON/OFF state; AM/FM band type and counted receive frequency when functioning as a radio; and the disk operating state, the track number, and the playback mode when the system is in the recording-media playback function. The display device 600 also has an interface 600B made of, for example, buttons and switches for accepting user keystroke inputs such as CD PLAY and PAUSE. Signals (external signals) reflecting such operation inputs are output to the system controller 40.

The system controller 40 is an integrated circuit (IC) that integrates and controls the overall functions of the audio system. The system controller 40 has a PLL (phase locked loop; playback processing section) 40*a*, a decoder (playback processing section) 40*b*, a DAC (digital/analog converter; playback processing section) 40*c*, an LPF (low pass filter; playback processing section) 40*d*, a controller (microcomputer; micon) 40*e* that performs centralized control of the operations of each circuit of the system controller 40, and a key-input interface 40*f*. The system controller 40 further includes a display control activation driver (display control circuit) 40*g* and a frequency counter (frequency measurement circuit) 40*h*.

Figure 2:
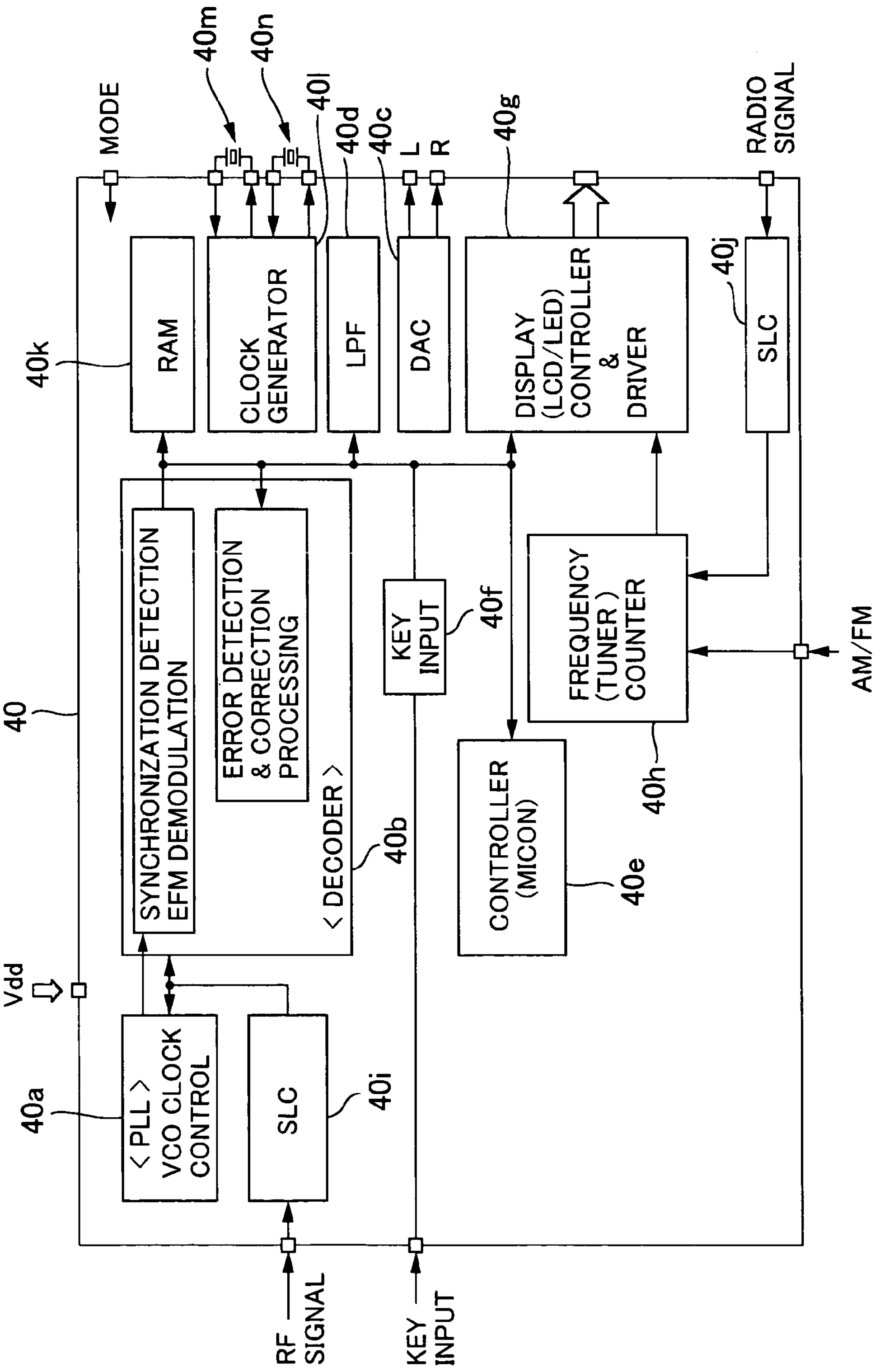
FIG. 2 is a block diagram showing the semiconductor integrated circuit of the present embodiment.

The system controller 40 is actually configured of a single semiconductor chip. A basic block diagram of the system controller 40 is shown in FIG. 2. As shown in FIG. 2, the system controller 40 also has slice level controllers (SLCs) 40*i*, 40*j* to be used for playback processing of optical disks, a RAM 40*k*, and a clock generator circuit 401. To the clock generator circuit 401 are connected first and second oscillators 40*m*, 40*n* via external terminals. The decoder 40*b* has a synchronization detection circuit section, an EFM demodulation circuit section, and an error correction circuit section. Further, power source Vdd is input to the system controller 40, and thereby operating power is supplied to each of the circuit sections.

First, the playback process of an RF signal obtained from an optical disk will be described. As conventionally known, the PLL 40*a* generates a playback clock for demodulation according to the RF signal from the RF amplifier and servo controller 30, and outputs the clock to the synchronization detection circuit section of the decoder 40*b*. The bit synchronization of the RF signal from the RF amplifier and servo controller 30 is maintained by the synchronization detection circuit section in the decoder 40*b*, and the RF signal undergoes EFM demodulation at the EFM demodulation circuit section and is converted into data bits. Then the error correction circuit section of the decoder 40*b* performs error correction for the converted data bits using the RAM 40*k*. The error-corrected data bits form a digital audio signal, and, after unnecessary signals are removed with the LPF (low pass filter) 40*d*, they are converted into audio signals at DAC 40*c*. Then the converted audio signals are externally output as an L audio signal and an R audio signal. Note that, upon error detection and correction, deinterleaving is also performed and data is rearranged into a predetermined order.

On the other hand, the frequency counter 40*h* measures the frequency of the radio signals sent from the tuner 200. That is, the frequency of the radio signals are measured by counting the number of cycles of electrical signals within a predetermined time interval, and the count data is output to the display control activation driver 40*g*.

Figure 3:
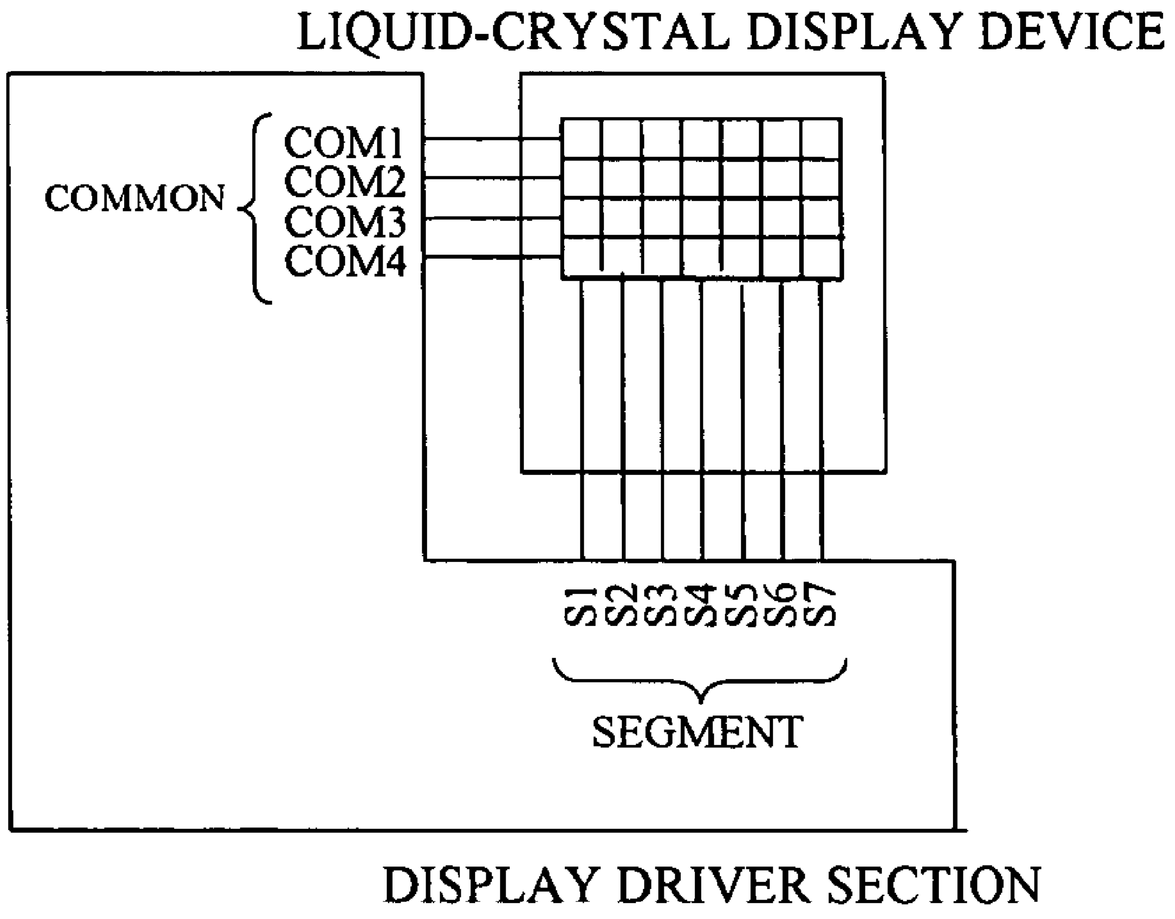
FIG. 3 is a schematic diagram showing a relationship between the liquid-crystal display device, and the segment signals and the common signals.
Figure 4A:
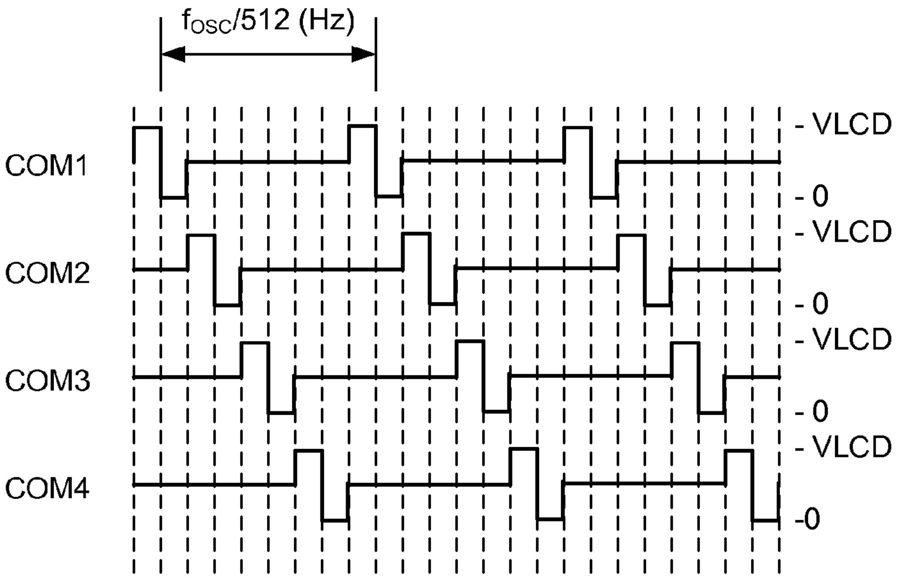
FIG. 4A and FIG. 4B are timing diagrams showing an example of common signals and segment signals output from a display control activation driver.
Figure 4B:
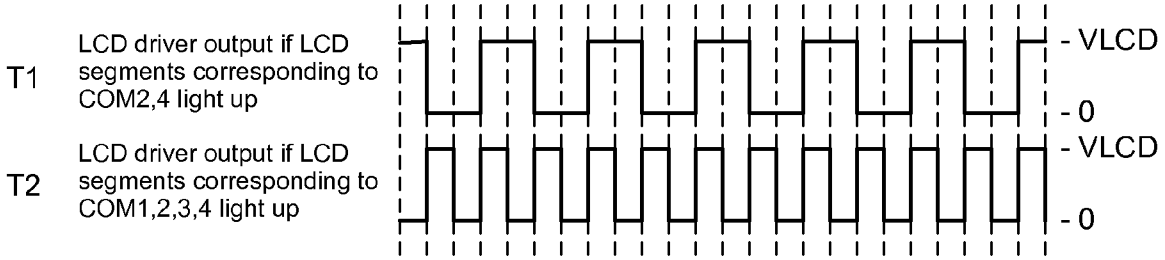

In order to make the display device 600 display the above-mentioned various kinds of information, including the measured radio signal frequency, the display control activation driver 40*g* sends out, to the display device 600, display drive signals according to, for example, the count data from the frequency counter 40*h* (the numeric section indicating frequency when functioning as a radio), control commands from the system controller 40 (the receive frequency band when functioning as a radio and the operating state when functioning as a CD player), and other display data (such as track No. when functioning as a CD player). That is, as shown in the figure, the display control activation driver 40*g* performs conversion into segment signals corresponding to the control data and the display data. For example, if the display device 600A is a liquid-crystal display device in compliance with the 7-segment displaying method (¼ duty, ½ bias), the liquid-crystal drive section of the display control activation driver 40*g* outputs common signals COM1-COM4 having constant waveforms, as shown in FIG. 4A, and segment signals SEC1, SEG2 corresponding to the common signals, as shown in FIG. 4B. The relation between the liquid-crystal display device, and the segment signals and the common signals is schematically shown in FIG. 3. One pixel of the liquid-crystal display device is connected to an intersection of a common signal and a segment signal, and light-up/shutoff of the liquid-crystal display pixels is controlled according to a difference in voltage between the common signal and the segment signal. Although this may depend on the characteristics of the liquid-crystal display elements, if, for example, the voltage difference is large, the pixel may light up, and if it is small, the pixel may turn out. The common signal is a signal having a constant waveform; as shown in FIG 4A four common signals are output at different timings. By outputting, in parallel, seven segment signals SEC1-SEG7 (in FIG. 3) in accordance with the timing shown in FIG 4B only the pixels connected to the common signal(s) COM1-COM4 in which the level has changed in FIG. 4B are lit up or turned off, according to the segment signals. For example, if one segment signal is to light up only the pixels connected to common signals COM2 and COM4, then a signal in accordance with the timing Ti shown in FIG. 4B may be output; if one segment signal is to light up the pixels connected to all of the common signals, then a segment signal in accordance with the timing T2 may be output.

Figure 5:
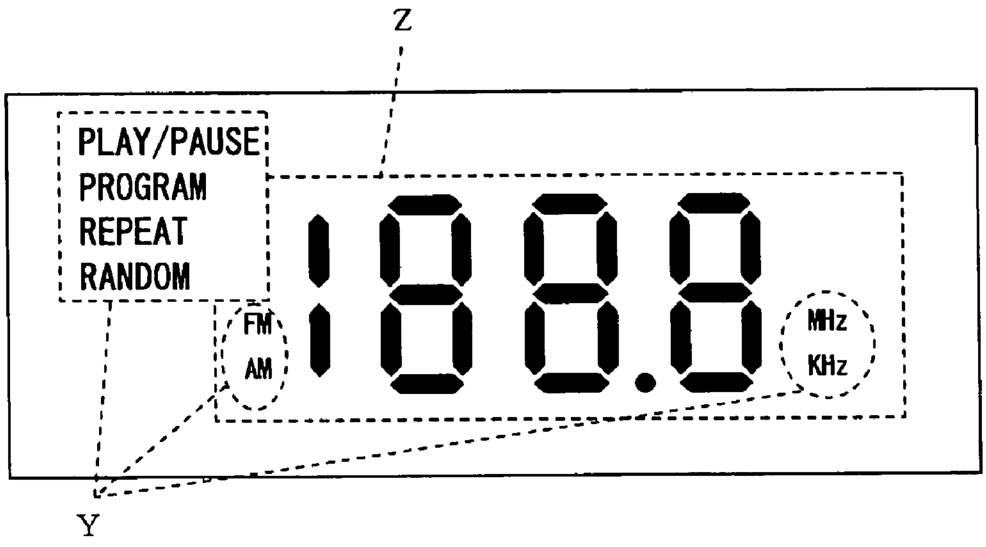
FIG. 5 shows the liquid-crystal display device of FIG. 1.

FIG. 5 shows only the liquid-crystal display device 600A of FIG. 1. As shown in FIG. 5, the device includes: a section (Y) for displaying numeric sections, such as the frequency when functioning as a radio and the track No. when functioning as a CD player; and a section (Z) for displaying, for example, the operating state when functioning as a CD player and the frequency band when functioning as a radio. The seven segment signals and the common signals COM1 through COM3 are connected to the frequency numeric section (Y), and the seven segment signals and the common signal COM4 are connected to the other section (Z). It is possible to make the display device 600A of FIG. 5 perform displaying by outputting, in accordance with the constant-waveform common signals, segment signals according to a desired display.

Figure 6:
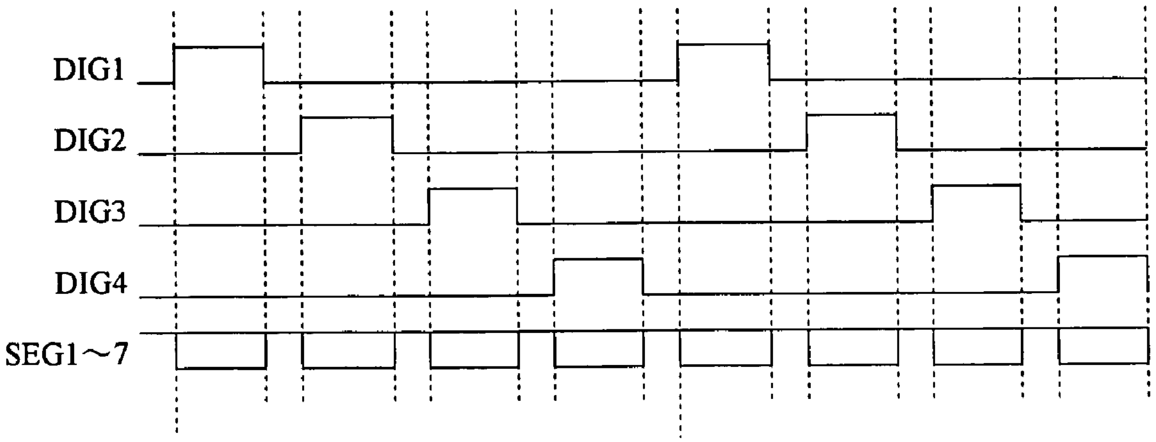
FIG. 6 is a diagram showing an example of digit signals output at different timings and segment signals.

Further, it is possible to use an LED display device for the display device 600A. In this case, as shown in FIG. 6, the display control activation driver 40*g* outputs digit signals DIG1 through DIG4 (equivalent to the common signals COM for the liquid-crystal display device) and segment signals SEG1 through SEG7. In each of the LEDs of the LED display device, the digit signals DIG1 through DIG4 are applied to the anodes, whereas the segment signals SEG1 through SEG7 are applied to the cathodes. As shown in FIG. 6, the digit signals DIG are signals having a constant waveform, and four digit signals are output at different timings, as shown in FIG. 6. Further, the segment signals are signals having either an "H" level or an "L" level, according to the display data. By outputting, in parallel, the seven segment signals SEG1-7 according to the timing shown in FIG. 6, only the LEDs connected to the digit signal(s) DIG1-DIG4 in which the level has changed in FIG. 6 are lit up or turned off according to the segment signals. In this way, it becomes possible to make the display device 600A of FIG. 5 perform displaying by outputting, in accordance with the constant-waveform digit signals, segment signals according to a desired display.

The clock generator circuit 401 selectively generates a first clock and a second clock, under control of the controller 40*e*. The first clock is the main clock for high-speed processing, and is generated to make the overall system controller 40, such as the servo controller 30 and at least the VCO clock control 40*a*, the SLC 40*i*, the decoder 40*b*, and the controller 40*e*, operate during playback of an optical disk, for example. On the other hand, the second clock is a sub-clock for low-speed processing and having a lower frequency than the first clock, and is generated to make the frequency counter 40*h*, for example, operate when the radio function is selected, for example. By selectively using the second clock, which has a lower frequency than the first clock, according to the operating state of the system controller 40, it becomes possible to reduce power consumption of the overall system controller 40.

More specifically, the clock generator circuit 401 generates the first clock based on an oscillation frequency (16 MHz) from the first oscillator 40*m* by applying processing such as waveform shaping, and supplies the first clock to each of the circuits including the system for playback processing for optical disks. Further, the clock generator circuit 401 generates the second clock based on an oscillation frequency (32 kHz) from the second oscillator 40*n* by applying processing such as waveform shaping, and supplies the second clock to circuits that operate in the tuner mode, such as the frequency counter 40*h*.

During CD playback, the first clock is supplied to the blocks including the servo controller 30 and at least the VCO clock control 40*a*, the SLC 40*i*, the decoder 40*b*, and the controller 40*e*, and the second clock is stopped from being supplied to the frequency counter 40*h*. During radio function, the first clock is stopped from being supplied to the servo controller 30 and at least the VCO clock control 40*a*, the SLC 40*i*, the decoder 40*b*, and the controller 40*e*, and the second clock is supplied to the frequency counter 40*h*. The switching between the first clock and the second clock is performed by stopping oscillation according to the second oscillator 40*n* when oscillation according to the first oscillator 40*m* is activated, or stopping oscillation according to the first oscillator 40*m* when oscillation according to the second oscillator 40*n* is activated.

Only during the radio function, the second clock is input to the frequency display counter 40*h* as a clock source. According to the band-switch signal AM/FM, the range within which frequency is counted is changed. That is, the characteristics switch from the MHz band for the FM receiving mode so that it is possible to count in the kHz band for the AM receiving mode, and vice versa.

Further, as the operation clock for the display control activation driver 40*g*, the first clock is applied when functioning as a CD player, and the second clock is applied when functioning as a radio. In the display control activation driver 40*g*, the first clock is received by a first frequency divider circuit (not shown), and the second clock is received by a second frequency divider circuit (not shown). The division ratio for each of the first and second frequency divider circuits is set so that the output frequency from each of the first and second frequency divider circuits is the same or substantially the same. Since the display control activation driver 40*g* operates according to the output signals from the first or second frequency divider circuit, operations, such as the timing for taking in display data etc. and the timing for outputting common signals (and/or digit signals) and segment signals, is performed at a predetermined timing, regardless of whether the operation is in the CD player function or the radio function.

Further, since the first oscillator 40*m* is stopped when the radio function is selected, it is possible to prevent influence on radio signals, such as radiation. The second clock, which is selected when the radio function is selected, is set so that it is sufficiently smaller than the frequency of radio signals supplied to the frequency counter 40*h*, that is, smaller than the AM or FM frequency band, and so that it does not match the frequency of the radio signal. Therefore, it is possible to prevent radiation due to mutual interference between the second clock and the radio signal.

The present embodiment achieves the following effects.

According to this embodiment, the above-mentioned playback processing circuit group for the optical disk, the frequency counter 40*h*, the display control activation driver 40*g*, and the controller 40*e* are formed on a single semiconductor chip. Therefore, compared to a case where each of these structural components are formed on separate chips from the controller, it becomes possible to decrease delay that occurs due to signal transmission between a plurality of chips, and thus high speed processing is made possible as a technical effect. Further, since the components are configured into a single chip in which wiring between a plurality of chips is unnecessary, it becomes possible to greatly simplify manufacturing processes as well as achieve downsizing and reduction in cost.

Further, according to this embodiment, the second clock, which is for making either one of the frequency counter 40*h* or the display control activation driver 40*g* operate, has a frequency smaller than a frequency of the first clock, which is for making the playback processing section operate. Therefore, when, for example, the playback processing section for the optical disk is not operated but either one of the frequency counter 40*h* or the display control activation driver 40*g* is made to operate, only the second clock having a low frequency will be necessary, and thus it is possible to achieve reduction in power consumption, compared to a case where the playback processing system for the optical disk is made to operate. Further, since it is possible to supply both the first clock and the second clock having a low frequency, it becomes possible to make only the functions other than the playback processing section for the optical disk operate at low power consumption.

Further, by preventing the frequency of the second clock from overlapping with the FM and AM frequency bands along with integration of the various circuits/sections into one chip, it becomes possible to prevent radiation.

The embodiment described above is merely an example of the present invention, and it is possible to make various modifications thereto without departing from the spirit of the present invention.

What is claimed is:

1. A semiconductor integrated circuit for an audio system comprising:

a playback processing section for playing back at least an optical disk;

a frequency measurement circuit for measuring a frequency of a radio signal from a tuner;

a display control circuit for making a display device display at least the frequency of said radio signal; and a controller for controlling at least said playback processing section, said frequency measurement circuit, and said display control circuit, according to an external signal, wherein:

said playback processing section, said frequency measurement circuit, said display control circuit, and said controller are formed on a single semiconductor chip;

said semiconductor chip has a clock generator circuit for generating a first clock for making at least said playback processing section, in said semiconductor chip, operate, and a second clock for making at least either one of said frequency measurement circuit or said display control circuit operate; and said second clock has a frequency smaller than a frequency of said first clock.

2. A semiconductor integrated circuit for an audio system according to claim 1 wherein said second clock is different from the frequency of said radio signal.

3. A semiconductor integrated circuit for an audio system according to claim 1 wherein said playback processing section includes an EFM demodulation circuit.

4. A semiconductor integrated circuit for an audio system according to claim 3 wherein said playback processing section includes an error detection and correction circuit.

5. A semiconductor integrated circuit for an audio system according to claim 1 wherein said playback processing section outputs an audio signal played back from a CD.

6. A semiconductor integrated circuit for an audio system according to claim 1 wherein said display control circuit includes a driver for making said display device activate.

7. A semiconductor integrated circuit for an audio system according to claim 6 wherein said driver outputs a common signal and a segment signal to a liquid-crystal display device.

8. A semiconductor integrated circuit for an audio system according to claim 6 wherein said driver outputs a digit signal and a segment signal to an LED display device.

9. A semiconductor integrated circuit for an audio system according to claim 1 wherein said controller is a microcomputer.

10. A semiconductor integrated circuit for an audio system according to claim 1 wherein said frequency measurement circuit takes an operation clock of said controller as a clock source.

* * * * *

UNITED STATES PATENT AND TRADEMARK OFFICE

CERTIFICATE OF CORRECTION

PATENT NO. : 7,236,431 B2 Page 1 of 1
APPLICATION NO. : 10/683209
DATED : June 26, 2007
INVENTOR(S) : Morimoto et al.

It is certified that error appears in the above-identified patent and that said Letters Patent is hereby corrected as shown below:

Column 5 line 11, replace “SEC1” with --SEG1--

Column 5 line 26, replace “SEC1” with --SEG1--

Column 5 line 34, replace “Ti” with --T1--

Column 6 line 7, replace “401” with --40l--

Column 6 line 23, replace “401” with --40l--

Column 6 line 29, replace “401” with --40l--

Signed and Sealed this

Seventh Day of August, 2007

JON W. DUDAS
*Director of the United States Patent and Trademark Office*